United States Patent [19]

Buday, Jr. et al.

[11] Patent Number: 5,653,327
[45] Date of Patent: Aug. 5, 1997

[54] INSERTER DEVICE AND A METHOD FOR TRANSPOSING A STREAM OF PRODUCTS USING THE SAME

[75] Inventors: John Martin Buday, Jr.; Gunther Adam Dorth, both of Des Plaines; Michael Romanenko, South Elgin, all of Ill.

[73] Assignee: ElectroCom Gard Ltd., Niles, Ill.

[21] Appl. No.: 327,432

[22] Filed: Oct. 21, 1994

[51] Int. Cl.⁶ .................................................. B65G 47/24
[52] U.S. Cl. .................................................. 198/408
[58] Field of Search .......................... 198/357, 370.04, 198/370.08, 408, 418.2, 418.3, 457, 464.2, 464.3, 469.1, 597, 598, 718, 721, 727, 734; 271/225

[56] References Cited

U.S. PATENT DOCUMENTS

| | | |
|---|---|---|
| 1,905,379 | 4/1933 | Gotthardt et al. ............ 198/370.08 |
| 2,393,961 | 2/1946 | Almgren . |
| 3,384,237 | 5/1968 | Leonard ................... 198/370.08 |
| 3,540,567 | 11/1970 | Keller . |
| 3,614,924 | 10/1971 | Hickey . |
| 3,628,646 | 12/1971 | Schuster et al. ............. 198/464.3 |
| 3,713,650 | 1/1973 | Hodgkinson et al. ............ 198/408 |
| 3,815,723 | 6/1974 | Wright et al. ............... 198/357 |
| 3,915,293 | 10/1975 | Melchiorre et al. ............ 198/408 |
| 4,160,500 | 7/1979 | VerMehren . |
| 4,193,491 | 3/1980 | James et al. . |
| 4,261,456 | 4/1981 | Scarpa et al. ............... 198/464.3 |
| 4,542,818 | 9/1985 | Pavie ........................ 198/408 |
| 4,549,645 | 10/1985 | Applegate ................... 198/408 |
| 4,760,910 | 8/1988 | Suzuki et al. . |
| 4,842,125 | 6/1989 | Besemann . |
| 4,854,440 | 8/1989 | Laube et al. ................. 198/357 |
| 4,858,770 | 8/1989 | Gamberini . |
| 4,974,717 | 12/1990 | Weichhand . |
| 5,058,726 | 10/1991 | Merritt ...................... 198/408 |
| 5,188,212 | 2/1993 | Munsch . |
| 5,282,498 | 2/1994 | Cahlander et al. . |
| 5,292,114 | 3/1994 | McConnell . |

FOREIGN PATENT DOCUMENTS

| | | |
|---|---|---|
| 0438667A3 | 7/1991 | European Pat. Off. . |
| 2013389 | 4/1970 | France . |
| 4309485A1 | 9/1994 | Germany . |
| 2005211 | 4/1979 | United Kingdom . |
| 2084531 | 4/1982 | United Kingdom . |

*Primary Examiner*—Joseph E. Valenza
*Attorney, Agent, or Firm*—Hill, Steadman & Simpson

[57] ABSTRACT

An inserter device and method for feeding products from an input conveyor to moving carriers on a conveyor system is provided. The inserter device receives incoming products and deposits the products on the carriers such that the products come to rest in a controlled area of the carrier and with a controlled orientation. A linear inserter device is provided which uses a series of rollers operating in a first direction to receive the product and a belt removes the products from the rollers onto carriers or other conveying devices. The belt moves in a rotational direction substantially ninety degrees (90°) displaced from the direction of rotation of the rollers. A rotary inserter device is also provided in which the products are received in a compartmented rotor such that rotation of the rotor allows dropping of the product, by gravity, onto a carrier in a manner synchronized with the speed of the rotation of the carrier.

5 Claims, 4 Drawing Sheets

FIG. 6

INSERTER DEVICE AND A METHOD FOR TRANSPOSING A STREAM OF PRODUCTS USING THE SAME

BACKGROUND OF THE INVENTION

The present invention generally relates to a feeding system. More specifically, the present invention relates to a feeding system which transfers products from the feeding system to moving carriers on a conveyor system. An inserter is employed capable of depositing the products such that the products come to rest within a controlled area of the carrier and with a controlled orientation.

It is, of course, known to transfer articles from a first conveyor apparatus to a second conveyor apparatus. An example of such a conveying system is shown and described in U.S. Pat. No. 4,160,500 to Mehren.

In the patent to Mehren, a turn conveyor apparatus is disposed between two conveyors having angularly related travel axes for the purpose of transporting articles, such as envelopes, from one conveyor to the other. The turn conveyor includes drive and idler sprockets having horizontal, angularly related axes of rotation. The sprockets are connected by an endless belt traversing a rotating corner disk assembly having a vertical axis of rotation and disposed between the sprockets. The disk assembly includes upper and lower disks receiving the endless belt, and the endless belt includes spaced friction pads on the outer surface. The disk assembly also includes a base disk located below the lower disk and having an annular surface disposed adjacent the endless belt and cooperating with the friction pads to grip the envelopes and transport them in an arcuate path from one angularly related conveyor to the other.

It is also known to rotationally transport objects from a first conveyor to a second conveyor wherein each of the conveyors have a longitudinal extending central axis. Such a system is described in U.S. Pat. No. 5,188,212 to Munsch.

The apparatus disclosed by Munsch includes a swivel arm with an axis and a rotary plate rotatably mounted on the swivel arm axis extending at least partially to the first and second conveyors. A drive is provided by rotating the rotary plate. The carriers are rotatably mounted beneath the rotary plate in regular intervals along the periphery of the rotary plate. The carriers have a gripper and a carrier axis for counter rotation and for consecutively gripping the object conveyed by the first conveyor. The objects are transported to a second conveyor and placed on the second conveyor without altering the orientation of the objects with respect to the first conveyor.

Each of the known systems, however, has its drawbacks. Primarily, the systems do not allow or provide controlled orientation from one conveyor onto a moving carrier of a second conveyor. Therefore, the known inserters are not constructed and arranged so as to provide an output of product in a desired orientation of the product being conveyed from the first conveyor to a second carrier or conveyor. Moreover, the known systems are not designed to provide synchronized conveyance of a product onto a moving carrier.

A need, therefore, exists for an improved inserter device and a method for inserting products carried from a first conveyor and transported to a second conveyor or carrier wherein the product can be deposited on the carrier within a controlled area and with a controlled orientation.

SUMMARY OF THE INVENTION

The present invention relates to an inserter mechanism for transferring products from a feeding system to moving carriers on a conveyor system. The inserter mechanism deposits the products to come within a controlled area of the carrier and with a controlled orientation.

To this end, in an embodiment, a method is provided for transposing a stream of flats. The method comprises the steps of: conveying the stream of flats in a first orientation; continuously and periodically receiving a leading flat from the stream of flats; and altering the first orientation of the leading flat from the stream to transport the leading flat in a second orientation wherein the first orientation and the second orientation define a direction of travel of the flats in the stream and further wherein the first orientation is substantially perpendicular to the second orientation.

In an embodiment, the method further comprises the step of rotating the leading flat after receiving the first flat to alter the leading flat from the first orientation to the second orientation.

In an embodiment, the method further comprises the step of providing a carrier to receive the leading flat in the second orientation.

In an embodiment, the method further comprises the step of providing a continuous belt capable of altering the leading flat from the first orientation to the second orientation.

In an embodiment, the method further comprises the step of providing a plurality of rollers for receiving the leading flat from the stream of flats.

In an embodiment, the method further comprises the step of releasing, by gravity, the leading flat from the stream of flats to orient the leading flat in the second orientation.

In another embodiment of the present invention, a linear inserter device is provided for continuously and periodically feeding one of a plurality of flats in a stream of flats from a conveyor to a carrier. The device has a plurality of rollers receiving a leading flat from the continuous stream of flats. The plurality of rollers rotates in a first direction and forces the leading flat from its bottom side. A belt continuously rotates in a second direction substantially perpendicular to the first direction wherein the belt forces the flat from its top side onto the carrier.

In an embodiment, the device has at least one tine extending from the belt to engage a side of the flat to force the flat onto the carrier.

In an embodiment, the device has a stop wall at an end of the plurality of rollers wherein the stop wall limits distance of travel of the leading flat by the plurality of rollers and guides the leading flat onto the carrier.

In an embodiment, the at least one tine of the device extends from the belt to penetrate between two adjacent rollers of the plurality of rollers.

In another embodiment of the present invention, a rotary inserter device is provided for continuous and periodic feeding one of a plurality of flats in a stream of flats from a conveyor to a carrier. The rotary inserter device has a means for receiving a leading flat from the stream of flats. The means for receiving has a plurality of compartments and is rotatable to receive one flat in each of the plurality of compartments wherein the leading flat is received from the conveyor in a first position of the means for receiving and the leading flat is released onto the carrier in a second position of the means for receiving. A stop wall maintains the leading flat in the means for receiving during rotation of the means for receiving between the first position and the second position.

In an embodiment, the plurality of compartments of the rotary inserter device are circumferentially disposed around a periphery of the means for receiving.

In an embodiment, the rotary inserter device further has a plurality of dividing walls dividing the means for receiving into the plurality of compartments.

In an embodiment, the flat is carried on an outside wall of the means for receiving.

In an embodiment, at least one tine of the rotary inserter device extends in a plane from each of the plurality of dividing walls.

In an embodiment, the rotary inserter device further has a drum on which the means for receiving is rotatably mounted. The drum has a back wall providing a stop of the leading flat upon receipt into one of the plurality of compartments of the means for receiving.

In an embodiment, the plurality of compartments is four.

In an embodiment, the first position of the rotary inserter device is oriented approximately one-hundred eighty degrees (180°) from the second position.

In an embodiment, the rotary inserter device further has guide plates constructed and arranged such that the means for receiving rotates within a boundary defined by the guide plates.

In an embodiment, a front plate is provided on the rotary inserter device and is constructed and arranged to receive the leading flat through an opening in the front plate.

It is, therefore, an advantage of the present invention to provide an insertion device and a method for inserting a product from a first conveying mechanism to a second carrier or conveyor.

Another advantage of the present invention is to provide an insertion device and a method for inserting or depositing a product from the insertion device such that the product comes to rest within a controlled area of a carrier.

Yet another advantage of the present invention is to provide an insertion device and a method for depositing products from the insertion device with a controlled orientation of the product onto a carrier or conveying mechanism.

A still further advantage of the present invention is to provide an insertion device and a method for depositing articles from the insertion device in a synchronized manner.

Moreover, an advantage is to provide an insertion device and a method for inserting products onto a moving carrier wherein the horizontal velocity of the product leaving the insertion device closely matches that of the carrier.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention relates to a system and a method for inserting products or other products to flat carriers on a conveyor system. The products are typically of a limited variable size in plan view and thickness dimension. The overall system performance depends on the ability of the inserter mechanism to change the directional motion of the product and deliver the product to moving carriers with predictable alignment and location inside a fixed rectangular boundary on the carrier.

The system receives randomly addressed flat products of material and ultimately delivers the products to locations corresponding to the addressed destination of the packet or product. A typical application is within a post office sortation system handling mail pieces termed "flats," such as magazines, catalogs and the like.

The sorter system uses a carrier conveyor system to transport mail to a designated destination container. A feeder system reads destination information printed on each piece prior to depositing the piece on a carrier. Each piece is then tracked through its travel on the conveyor. A computerized control and tracking system issues commands to remove the piece and deposit the piece in its designated destination container.

The containers can be smaller in plan view area than the carrier area, therefore, allowing a requirement that the mail piece rest within a specified boundary of the carrier floor. This is necessary to ensure that the piece falls within the area formed by the container walls. The inserter concept described by the present invention has a unique capability to fulfill this operational need. The product, therefore, arrives at its designated station and is delivered with a predictable orientation and horizontal position to a container which is then handled by a secondary system.

Figures 1, 2:
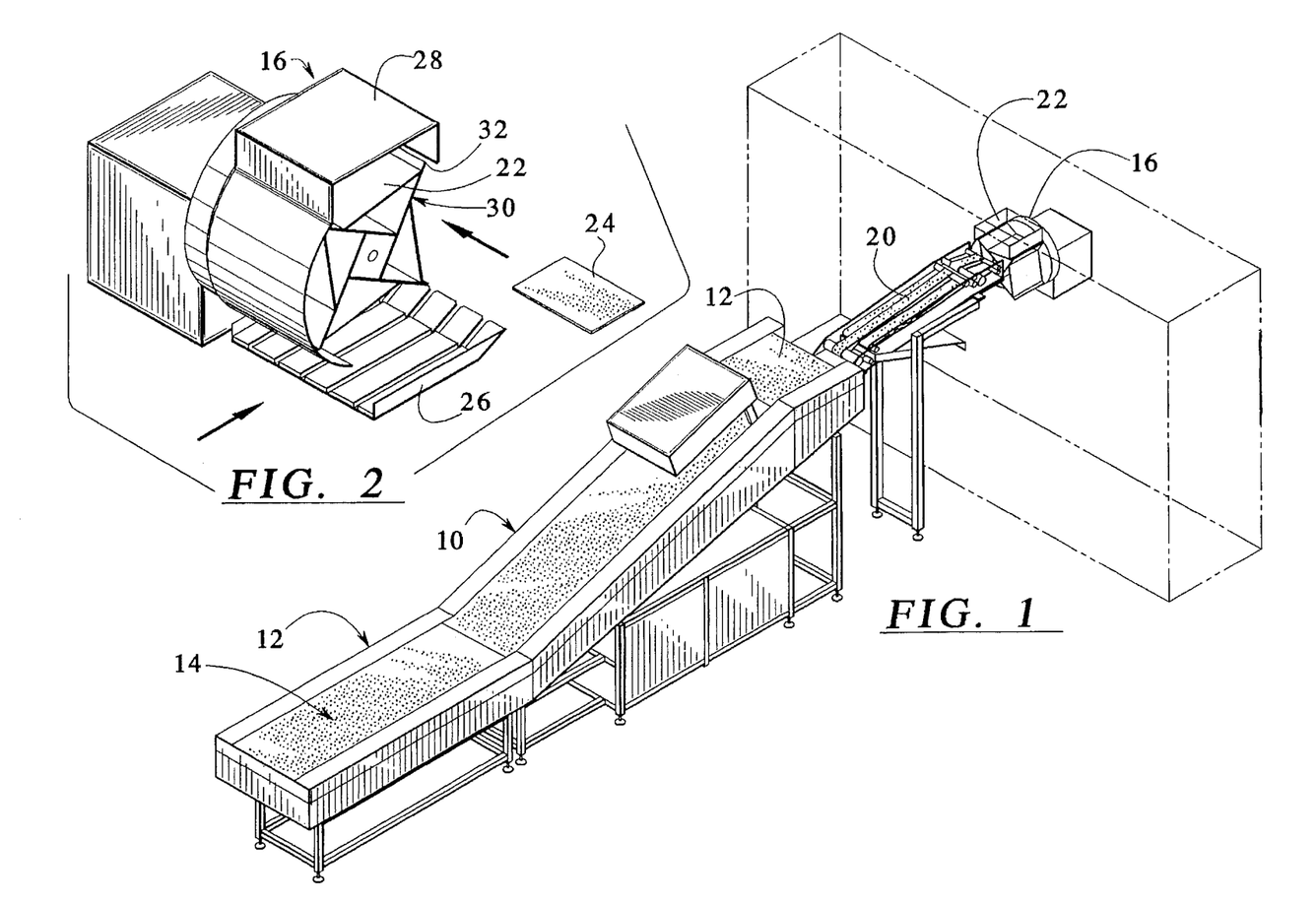
FIG. 1 illustrates a perspective view of a conveying system and an interface conveyor for inserting a product from a stream of products into an embodiment of an insertion device of the present invention.
FIG. 2 illustrates a perspective view of an embodiment of a rotary inserter of the present invention.

Referring now to the drawings wherein like numerals refer to like parts, FIG. 1 generally illustrates a ramp singulator 10. Products or products, such as "flats," are deposited in shingled and unaligned states at the input of the ramp singulator 10 at a product input area 12. (Product not shown in FIG. 1.) The products are continuously driven by a conveyor 14 from the product input area 12 of the ramp singulator 10 toward an inserter unit 16, such as a rotary inserter of the present invention, as illustrated in FIG. 1.

During travel of the product from the product input area 12 up the conveyor 14 to the inserter unit 16, the product is singulated, aligned, edged and separated by predetermined front-edge to front-edge spacing. Arrival of product at an input of the inserter unit 16 is synchronized with the motion cycle of the inserter unit 16. To this end, an output area 18 of the ramp singulator 10 feeds the product onto an interface conveyor 20. The interface conveyor 20 includes a means to accelerate the product into an inserter compartment 22 by means of a triggered intermittent motion interface transport of the interface conveyor 20. Of course, other known means may be used to advance product into the compartments 22 of the inserter unit 16.

Referring now to FIG. 2, a product 24, such as a mail flat, is shown. The product 24 is received into a compartment 22 of the inserter unit 16. The inserter unit 16 receives the incoming product 24 in a controlled registration within one of its compartments 22. The inserter unit 16 as shown includes four identical compartments 22 located ninety degrees (90°) apart in a circular arrangement. However, the inserter unit 16 may include more or less compartments as the application permits.

The inserter device 16 is rotated by an intermittent trigger in synchronization with the arrival of carriers 26 on a separate conveyor system conveying carriers in a direction substantially perpendicular direction to the conveyor 14. Such carriers are shown and described in, for example, U.S. Pat. No. 5,419,457 filed on Aug. 30, 1993, commonly assigned to the assignee of the present invention, the disclosure of which is fully incorporated herein by reference.

The inserter unit 16 includes a number of operational requirements including that the inserter unit 16 is at rest when the incoming product 24 arrives. Additionally, the inserter unit 16 must provide for product registration within the compartment 22 of the inserter unit 16. In addition, the inserter unit 16 delivers the product 24 via rotation of the inserter unit 16 so that the product falls due to gravity onto a moving conveyor carrier 26 in a nearly horizontal aspect and with a tangential horizontal velocity closely matching the velocity of the carrier 26.

Thus, the product 24 contacts a surface of the carrier 26 with an initial velocity close to the velocity of the carrier 26 and experiences contact forces from the carrier 26 opposed by the surface frictional forces. In a preferred embodiment of the present invention, a high friction component surface is integrally formed on or secured to an upper surface of the carrier 26. This ensures that the product 24 remains at rest on the carrier 26 within a controlled boundary location on the carrier 26 and with a minimum time for the product to "settle" on the carrier 26. This feature is critical due to subsequent sweeping of the product 24 from the carrier 26 into a receiving container (not shown) as described in U.S. Pat. No. 5,419,457.

The product 24, therefore, must fall into the container within a controlled boundary area and location and with a controlled orientation. The deposit of the product 24 onto the carrier 26 from the inserter unit 16 provides controlled product stacking within the container and further provides the desired operational requirements for the overall system in which the inserter device 16 is implemented.

As described in U.S. Pat. No. 5,419,457, a train of flat carriers 26 is separated by a fixed spacing and is driven at a constant speed by a chain or other linkage. The surface of the carrier 26 is configured to accept a raked, sweep-out of product at designated delivery stations. The flat area of the carrier 26 is provided with a high friction surface as set forth above. The carrier conveyor system is equipped with rake assemblies located at container loading stations. Under control of tracking software commands, the rakes are actuated to sweep the product 24 off the carrier 26 and into a designated container.

A conveyor system is interfaced with the carrier system so that containers are provided at loading stations and provided with means to detect a full state of the containers. When a container becomes full, it may be released to a separate conveyor system for distribution to transportation, and an empty container may then be loaded into the station.

The speed and through-put of the system is determined by the carrier conveyor chain drive. This, however, is not necessarily a controlled parameter of the computerized control system. Various control technologies are available, such as bar codes, to machine-read product destination prior to the insertion phase. The identification and location of all carriers are known by means of a digital shaft encoder coupled to the chain drive. The inserter cycle is locked to the carrier drive speed by its requirement to synchronize and match speed to the carrier arrival. Thus, the control system can use its information of chain travel to issue trigger pulses to the inserter servo drive.

Similarly, knowledge of the inserter cycle state is available to coordinate the feeding of a product from the interface conveyor 20 into the compartment 22 of the inserter unit 16. The status and distribution of filled containers is a separate controlled operation loosely coupled to the sortation system and under control of a destination scheme.

Referring now to FIGS. 2–5, one embodiment of the inserter unit 16 is illustrated. In general, the inserter unit 16 accommodates a range of sizes and weights of a semi-rigid rectangular solid product within specified limits. In addition, the inserter unit 16 preserves the "facing" aspect of the product by ensuring that the preferred face of the product 24 faces up when deposited to the carrier. Still further, the inserter unit 16 ensures that the product 24 is predictably registered in one of the compartments 22 of the inserter unit 16 throughout the insertion cycle. The product, as a result, is delivered to the carrier 26 moving below the inserter unit 22 while maintaining a nearly horizontal orientation and with a tangential velocity closely matching the velocity of the carrier 26 at the moment of contact in order to control its rest position on the carrier 26.

Figures 3, 4:
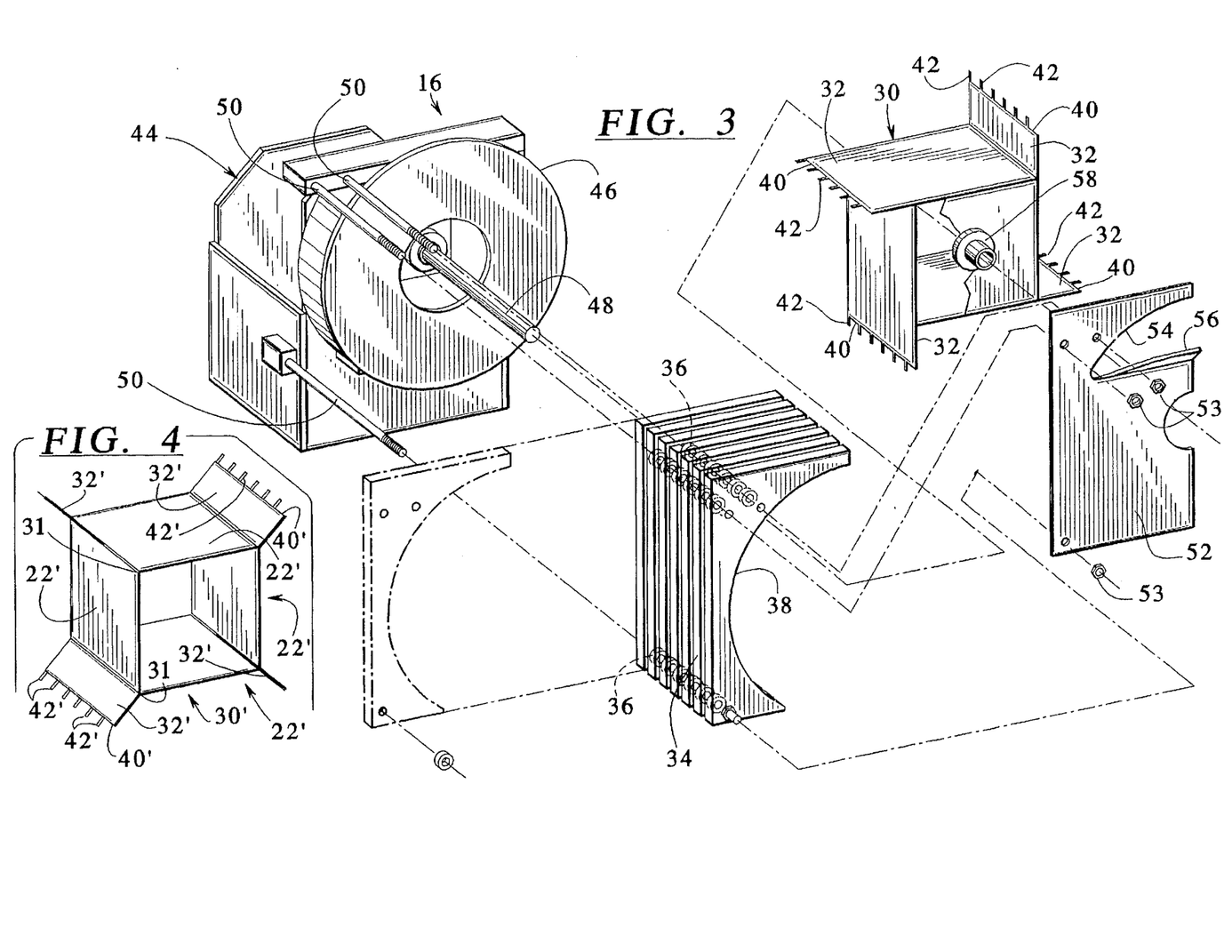
FIG. 3 illustrates an exploded view of components of an embodiment of a rotary inserter device of the present invention.
FIG. 4 illustrates a perspective view of an alternate embodiment of a rotor of an embodiment of the rotary inserter device of the present invention.

FIGS. 3 and 4 illustrate two versions of a four-compartment configuration as used in the inserter unit 16. Although the present invention should not be construed as limited to the four compartments as illustrated in FIGS. 3 and 4, the four compartment configuration offers compactness of size and a short index travelled when coupled to a four-stop indexer drive.

The inserter unit 16 has a rotary sub-assembly rotated within a shroud 28. A rotor 30 and the shroud 28 provide a sequence of product compartments 22. The compartments 22 in the embodiment illustrated in FIGS. 2–4 cycle through ninety degree (90°) rotation increments with a servo controlled acceleration and deceleration velocity ramps. Each of the compartments 22 has a sloped floor (as illustrated in FIG. 2) provided by a small angle inward to the shelf of each of the compartments 22 of the rotor 30. The sloped floor assists the product 24 to register by gravity against a rear wall of the entry station and provides location control of the product 24 in a single plane.

A vane 32 of the rotor 30 together with the shroud 28 provide registration in a second orthogonal plane and also control tangential velocity of the product 24 leaving the respective compartment 22 of the inserter unit 16. Referring to the exploded view of the inserter unit 16 in FIG. 3, a stack of rigid guide plates 34 is provided. The guide plates 34 are separated with spacers 36 a fixed separation between the plates 34.

The plates 34 have a circular arc segment 38 on the face adjacent to an edge of the vane 32 of the rotor 30. The arc 38 extends from roughly half the width of a compartment of the rotor 30 at the uppermost compartment of the rotor 30 and ends at a controlled angle short of horizontally over the carriers 26. Edges 40 of the vanes 32 of the rotor 30 have teeth 42 uniformly projecting from the edges 40 to fit between the guide plates 34 in areas defined between the spacers 36. As a result, a product is trapped in a compartment of the rotor 30 as the rotor 30 rotates through its insertion cycle.

As further illustrated in FIG. 3, a support housing 44 is provided having an enclosed drive mechanism (not shown).

A back plate 46 rotates on a drive shaft 48 extending from the support housing 44. A plurality of threaded support rods 50 are further provided on which the guide plates 34, the spacers 36 and a front cover 52 are secured to the support rods 50 and maintained by nuts 53 threading onto ends of the rods 50. The front cover 52 has a receiving slot 54 with a lip 56 through which a product is received into a top compartment of the rotor 30. A support hub 58 is provided to secure the rotor 30 to the drive shaft 48 along rotation of the rotor 30 within the guide plates 34 and the shroud 28.

Another embodiment of a rotor 30' is illustrated in FIG. 4. The rotor 30' includes vanes 32' having edges 40' angularly projecting from corner edges 31 of the rotor 30'. As a result, a product may be retained within each compartment 22' and may further prevent products from sliding within the compartment 22' toward the guide plate 34 during rotation of the rotor 30' by the orientation of the vane edges 40' of the vanes 32'.

Figure 5:
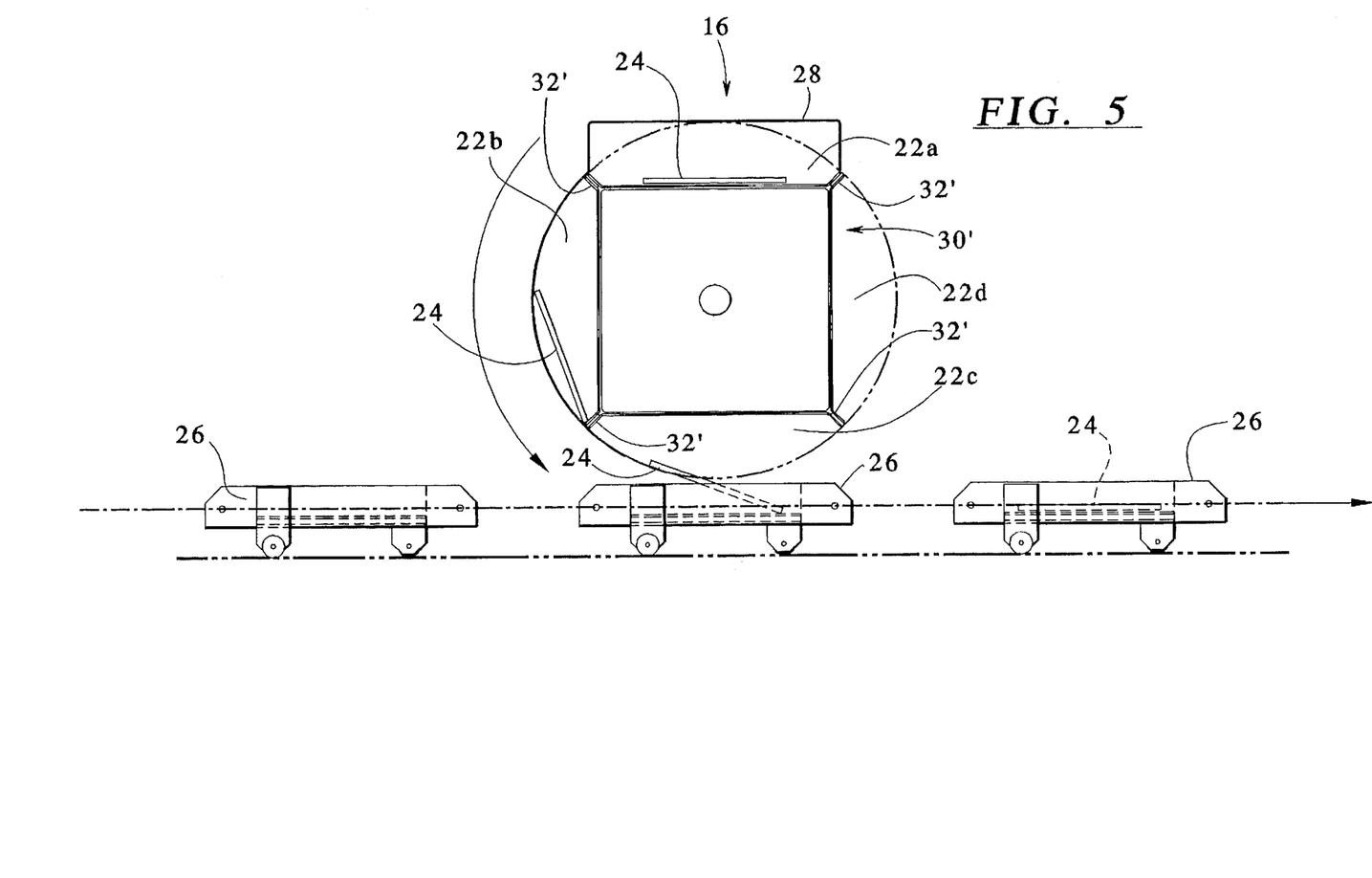
FIG. 5 illustrates a side plan view of an embodiment of a rotary inserter device of the present invention depositing product from the rotary inserter device onto carriers.

Referring now to FIG. 5, an inserter cycle is generally illustrated by a representative inserter sequence from product in-feed to delivery of product to a conveyor carrier 26. A product 24 is inserted into a compartment 22a defined by the shroud 28 and a base plate of the rotor 30' and the vanes 32'. The shroud 28 in the embodiment illustrated prevents the product 24 from exiting the compartments 22a, 22b as the rotor 30 rotates in the direction illustrated in FIG. 5.

When the product 24 is rotated to a position approximately one-hundred eighty degrees (180°) displaced from the point of entry of the product 24 into the compartment 22c, the product 24 is allowed to drop, by gravity, from the compartment 22c onto the carrier 26 as shown in FIG. 5. The carriers 26 are spaced and the speed of rotation of the rotor 30' is synchronized such that the product 24 may be continuously dropped onto each of the carriers 26 in a controlled orientation and within a defined area of the carrier 26.

A four-step sequence controls registration of the product 24 in the compartment 22a, 22b, 22c and 22d. At the start of the sequence, the inserter unit 16 is at rest, and the interface conveyor 20 (FIG. 1) feeds the product 24 into the top compartment 22a whose floor is sloped to gravity assist edging of the product into the compartment 22a. The product 24 is fed in by the interface conveyor 20 with enough velocity for the product 24 to come to rest against the back plate 46 of the insertion compartment 22a, but not enough force to result in any significant rebound of the product 24 from the back plate 46.

A control system is designed to have knowledge of velocity of the carriers 26 and the location of each of the carriers 26 such that a trigger pulse institutes a servo-controlled rotation of ninety degrees (90°) of the rotor 30' of the inserter unit 16. At the end of the net rotation cycle, the inserter unit 16 is again at rest and the product 24 is now registered against the vane 32' of the compartment 22b and a wall of the shroud 28. The product 24 begins rotation to a horizontal attitude of its resting state on the carrier 26. Again, the control system triggers a rotation cycle. During each rotation cycle, of course, a new product 24 may be fed into the top compartment 22a of the inserter unit 16.

During the next rotation cycle, the product 24 continues to rotate toward horizontal with its forward edge positioned by the vane 32' of the compartment 22b with a rear edge of the product 24 resting against the shroud 28 of the inserter unit 16. Therefore, the orientation of the product 24 is rotated toward the horizontal plane while following the angular velocity of the forward vane that it is resting against until its forward edge falls free of the shroud 28 by gravity.

At this time, the product 24 has acquired a tangential velocity substantially the same as the velocity of the carrier 26. The point of release by the shroud 28 of the product 24 at the lower compartment 22c is designed to provide a sufficient downward angle of the product 24 as it contacts the carrier 26 to discourage aerodynamic float leading to loss of placement control on the carrier 26 of the product 24. The acceleration force of the carrier 26 caused by any difference between delivery velocity of the product 24 and velocity of the carrier 26 is overcome by a surface friction on a bottom wall of the carrier 26. The product 24, therefore, comes to rest within a controlled boundary area relative to the carrier 26. An empty compartment 22d is, therefore, returned to a top feed-in position to continue the insertion sequence.

As a result of the foregoing, position registration of the product 24 is provided in a horizontal plane. Delivery of the product 24 to the moving carrier 26 with a horizontal velocity closely matching that of the carrier 26 is further provided. The features are provided in a controlled time sequence manner allowing synchronization of the insertion of the product 24 to the carrier 26. The inserter unit 16, therefore, provides a means to deliver the product 24 to the moving carriers 26 with an accurate location and orientation within a controlled boundary area of the carrier 26. Subsequent removal of the product 24 from the carrier 26 by, for example, a sweeping device (not shown) is provided as described in U.S. Pat. No. 5,419,457.

Figure 6:
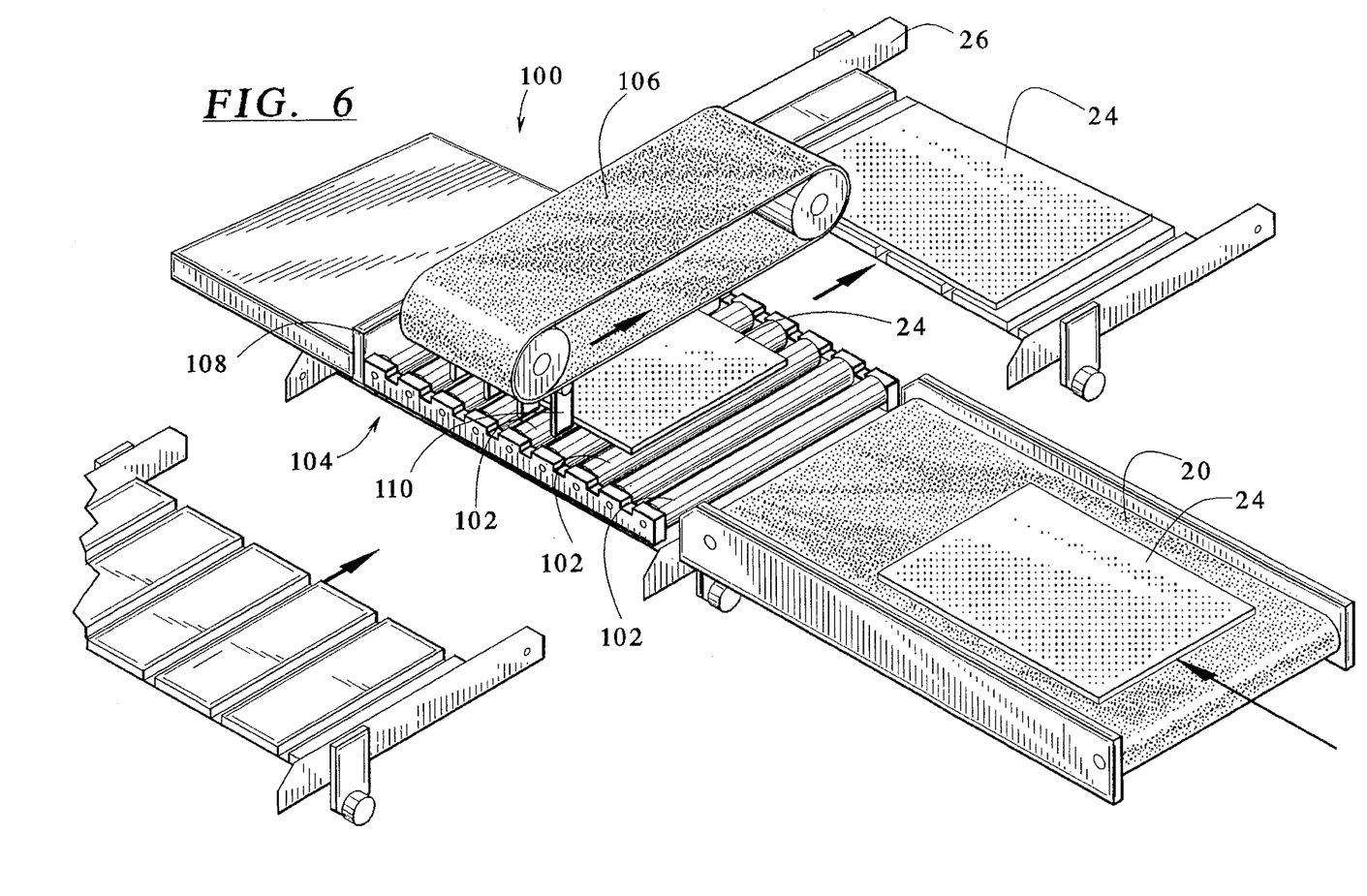
FIG. 6 illustrates a perspective view of an embodiment of a linear inserter device of the present invention with products being transposed to carriers.

An alternate embodiment of an insertion mechanism is illustrated in FIG. 6, referred to as a linear inserter 100. The components of the system leading to insertion of product into the linear inserter 100 are the same or similar to that shown and described with reference to FIG. 1. That is, the interface conveyor 20 receives a product 24 from a stream of product allowing a roughly controlled separation between leading edges of the product 24. The input belt speed of the conveyor 20 is synchronized with the speed of an output carrier conveyor system to match the rate of throughput of the product 24. Although the spacing of the products 24 on the input conveyor 20 is roughly controlled, the orientation and alignment are not tightly controlled.

In an automated system, the destination of the products are coded such as, for example, with bar codes, on the products 24 in a form for reading by sensors. The sensor readings are stored in a computer control system to allow the product to be tracked as it progresses through the system. Therefore, the conveyor system output destination of each product is assumed to be known as it reaches the inserter.

The linear inserter 100 includes a group of rollers 102 referred to collectively as a roller conveyor 104. The rollers 102 have low friction surfaces and are driven as a group at a rotational velocity sufficient to provide a linear transfer speed higher than the speed of the interface conveyor 20. The incoming product 24 is accelerated beneath a transfer belt 106 quickly enough to ensure that the product 24 comes to rest against an edging fence 108. This controls the orientation of the product 24 before the product 24 is inserted to an output carrier 26. The timing of the arrival of the product 24 from the belt of the interface conveyor 20 together with the speed of the rollers 102 is chosen such that the product 24 will come to rest against the edging fence 108 prior to the product 24 being pushed from the roller conveyor 104 onto the carrier 26 by the transfer belt 106.

The inserter belt 106 is positioned above at least a portion of the rollers 102 and the incoming product 24. The linear motion of the transfer belt 106 is perpendicular to the motion of the input belt of the interface conveyor 20 and matches the velocity of the output carrier 26. A set of rigid fingers 110 is fastened to the transfer belt 106 and arranged to pass between adjacent rollers 102 for roughly one-half of a cycle of the transfer belt 106. The fingers 110 contact an edge of the product 24 and push the product 24 to the output carrier 26 with a final velocity matching the velocity of the carrier 26. The transfer belt 26 is, therefore, phase-controlled to synchronize with the output carrier 26 so that it drops the product 24 on a known or tracked output carrier 26 in a controlled direction and location on the carrier 26.

The carriers 26 are separated by fixed spacing and are driven at a constant velocity by a chain or other linkage as shown and described in U.S. Pat. No. 5,419,457. A flat area of the carrier 26 may be provided with a high-friction surface. Therefore, the products 24 contacting the carrier 26 with a matching linear velocity rest on the carrier 26 within a controlled carrier boundary and with a controlled orientation provided by the combination of the edging fence 108 and the belt fingers 110 of the linear inserter 100.

As a result of the foregoing, the linear inserter 100 provides position registration of the product 24 in a horizontal plane and delivery of the product 24 to the moving carrier 26 with a horizontal velocity closely matching the velocity of the carrier 26. These features are provided in a controlled time sequence allowing synchronization of the insertion of the product 24 to the carrier 26 for subsequent distribution into containers. The features of the linear inserter 100 also provide delivery of the product 24 to the moving carriers with accurate location and orientation within a controlled boundary area of the carrier 26.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A rotary inserter device for continuously and periodically feeding one of a plurality of flats in a stream of flats from a conveyor to a carrier, the device comprising:

means for receiving a leading flat from the stream of flats, the means for receiving having a plurality of exterior walls perpendicularly arranged with respect to each other to form four circumferentially displaced compartments around an exterior of the means for receiving wherein each of the compartments is rotatable to receive one flat in each of the plurality of compartments wherein the flat lays flushly on the exterior wall to be carried on the exterior wall and further wherein the leading flat is received from the conveyor in a first position of the means for receiving and the leading flat is released onto the carrier in a second position of the means for receiving;

a plurality of dividing walls extending away from the exterior walls separating and defining the plurality of compartments wherein the walls maintain the flats in the compartments of the means for receiving during rotation of the means for receiving between the first position and the second position; and at least one tine extending in a plane from each of the plurality of dividing walls.

2. A rotary inserter device for continuously and periodically feeding one of a plurality of flats in a stream of flats from a conveyor to a carrier, the device comprising:

means for receiving a leading flat from the stream of flats, the means for receiving having a plurality of exterior walls perpendicularly arranged with respect to each other to form four circumferentially displaced compartments around an exterior of the means for receiving wherein each of the compartments is rotatable to receive one flat in each of the plurality of compartments wherein the flat lays flushly on the exterior wall to be carried on the exterior wall and further wherein the leading flat is received from the conveyor in a first position of the means for receiving and the leading flat is released onto the carrier in a second position of the means for receiving;

a plurality of dividing walls extending away from the exterior walls separating and defining the plurality of compartments wherein the walls maintain the flats in the compartments of the means for receiving during rotation of the means for receiving between the first position and the second position; and a drum on which the means for receiving is rotatably mounted, the drum having a back wall providing a stop of the leading flat upon receipt into one of the plurality of compartments of the means for receiving.

3. A rotary inserter device for continuously and periodically feeding one of a plurality of flats in a stream of flats from a conveyor to a carrier, the device comprising:

means for receiving a leading flat from the stream of flats, the means for receiving having a plurality of exterior walls perpendicularly arranged with respect to each other to form four circumferentially displaced compartments around an exterior of the means for receiving wherein each of the compartments is rotatable to receive one flat in each of the plurality of compartments wherein the flat lays flushly on the exterior wall to be carried on the exterior wall and further wherein the leading flat is received from the conveyor in a first position of the means for receiving and the leading flat is released onto the carrier in a second position of the means for receiving;

a plurality of dividing walls extending away from the exterior walls separating and defining the plurality of compartments wherein the walls maintain the flats in the compartments of the means for receiving during rotation of the means for receiving between the first position and the second position wherein the first position is oriented approximately one-hundred eighty (180) degrees from the second position.

4. A rotary inserter device for continuously and periodically feeding one of a plurality of flats in a stream of flats from a conveyor to a carrier, the device comprising:

means for receiving a leading flat from the stream of flats, the means for receiving having a plurality of exterior walls perpendicularly arranged with respect to each other to form four circumferentially displaced compartments around an exterior of the means for receiving wherein each of the compartments is rotatable to receive one flat in each of the plurality of compartments wherein the flat lays flushly on the exterior wall to be carried on the exterior wall and further wherein the leading flat is received from the conveyor in a first position of the means for receiving and the leading flat is released onto the carrier in a second position of the means for receiving;

a plurality of dividing walls extending away from the exterior walls separating and defining the plurality of compartments wherein the walls maintain the flats in the compartments of the means for receiving during rotation of the means for receiving between the first position and the second position; and guide plates constructed and arranged such that the means for receiving rotates within a boundary defined by the guide plates.

5. A rotary inserter device for continuously and periodically feeding one of a plurality of flats in a stream of flats from a conveyor to a carrier, the device comprising:

means for receiving a leading flat from the stream of flats, the means for receiving having a plurality of exterior walls perpendicularly arranged with respect to each other to form four circumferentially displaced compartments around an exterior of the means for receiving wherein each of the compartments is rotatable to receive one flat in each of the plurality of compartments wherein the flat lays flushly on the exterior wall to be carried on the exterior wall and further wherein the leading flat is received from the conveyor in a first position of the means for receiving and the leading flat is released onto the carrier in a second position of the means for receiving;

a plurality of dividing walls extending away from the exterior walls separating and defining the plurality of compartments wherein the walls maintain the flats in the compartments of the means for receiving during rotation of the means for receiving between the first position and the second position; and a front plate constructed and arranged to receive the leading flat through an opening in the front plate.

\* \* \* \* \*